April 1, 1958     K. O. JOHNSON     2,828,607
DUAL ENGINE SUPPORT
Filed Oct. 24, 1955     2 Sheets-Sheet 1
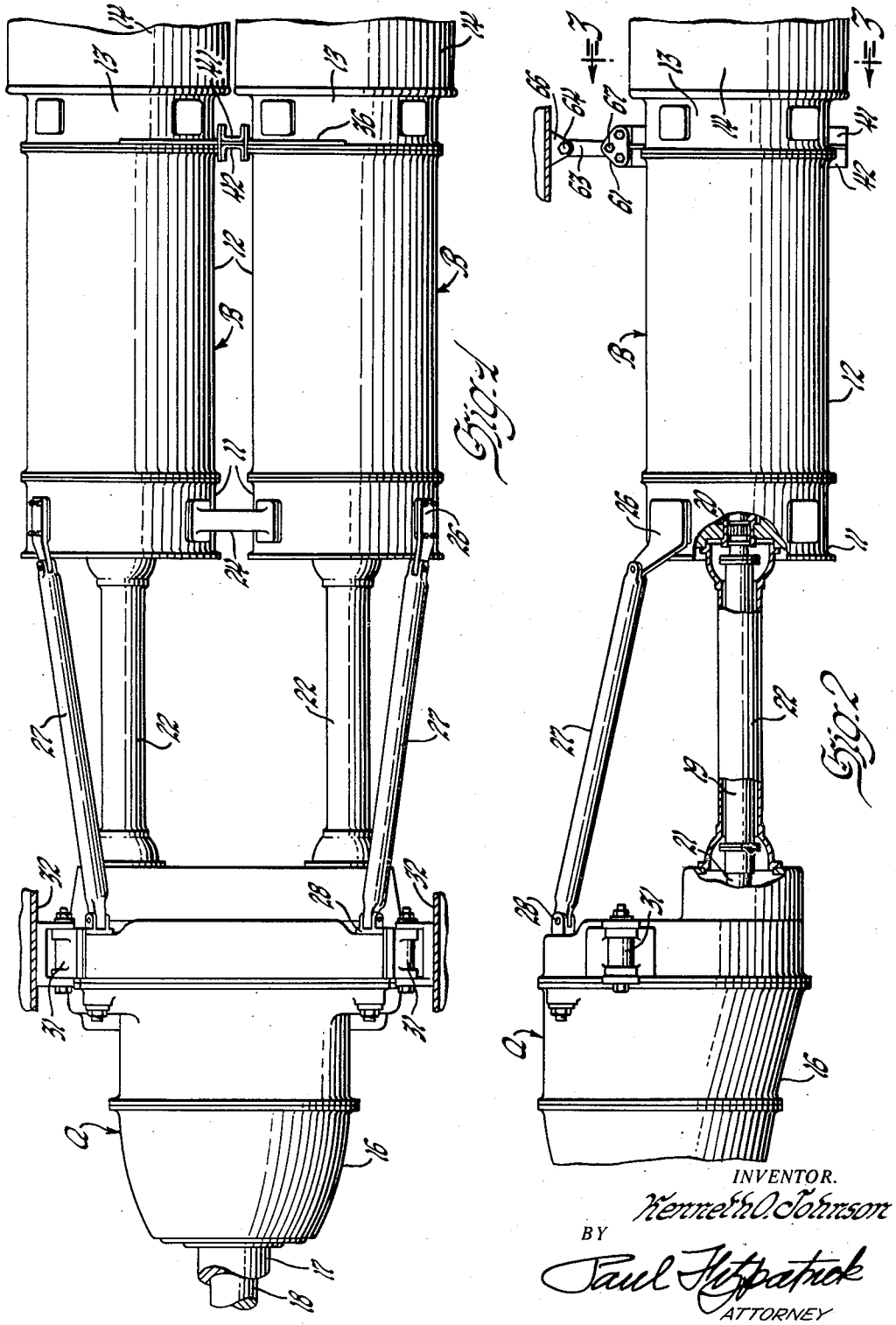
INVENTOR.
Kenneth O. Johnson
BY Paul Fitzpatrick
ATTORNEY April 1, 1958      K. O. JOHNSON      2,828,607
DUAL ENGINE SUPPORT
Filed Oct. 24, 1955      2 Sheets-Sheet 2
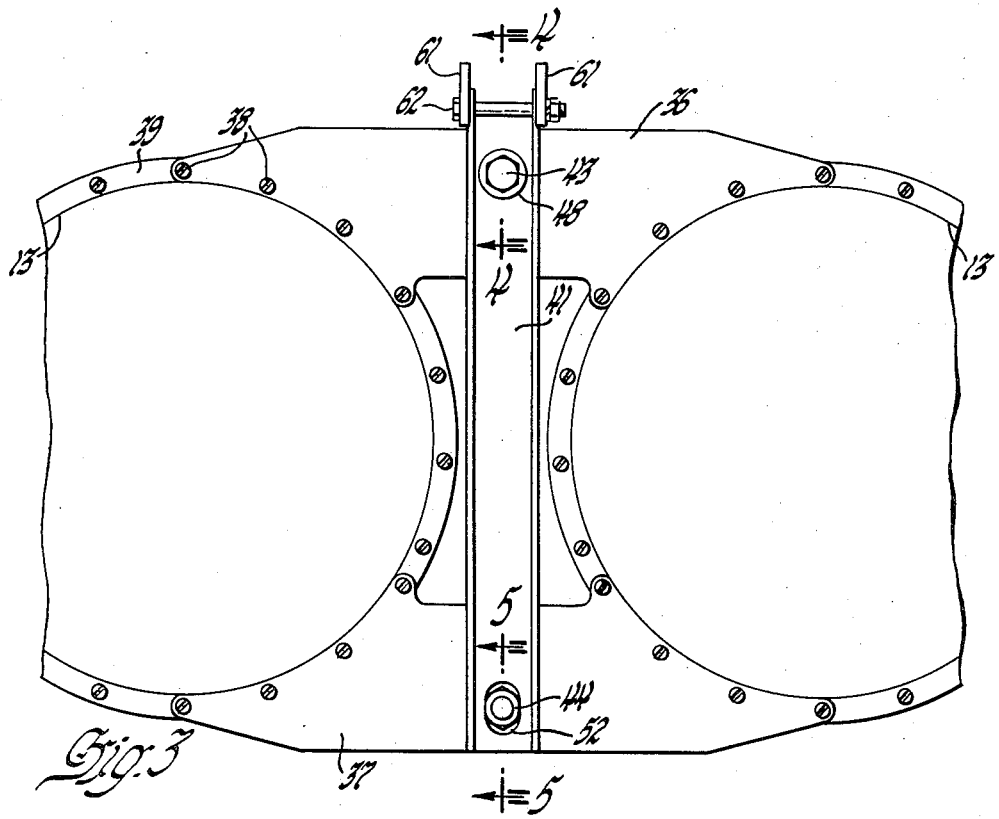
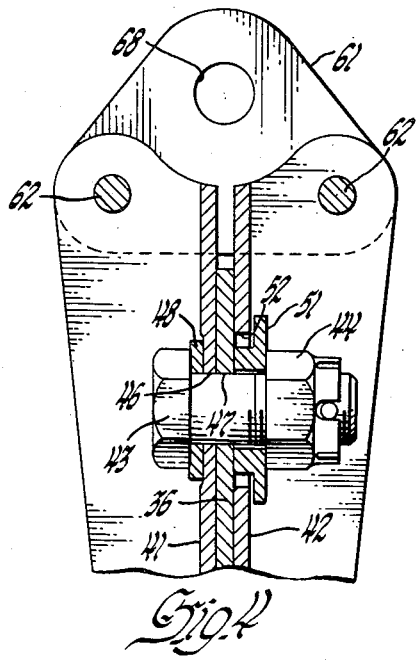
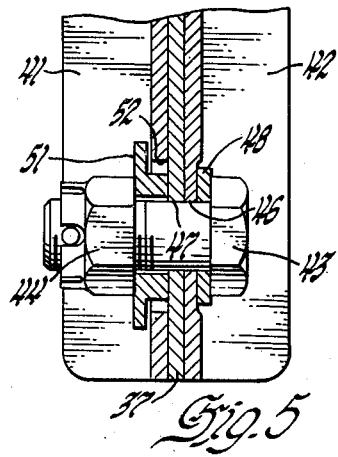
INVENTOR.
Kenneth O. Johnson
BY Paul Fitzpatrick
ATTORNEY ര
United States Patent Office 2,828,607
Patented Apr. 1, 1958

2,828,607

DUAL ENGINE SUPPORT

Kenneth O. Johnson, Camby, Ind., assignor to General Motors Corporation, Detroit, Mich., a corporation of Delaware Application October 24, 1955, Serial No. 542,201

7 Claims. (Cl. 60—39.31)

This invention relates to supports for power plants of a type including two power units acting in conjunction and having a common support.

A power plant installation of this sort is described and claimed in McDowall U. S. Patent 2,718,756. The power plant comprises two gas turbine engines structurally coupled to a common reduction gear and propeller. The power plant is supported in the aircraft by two supports at the reduction gear and by a third support connected to the power units. This invention is directed to an improvement in the third support of such a power plant, although it may be applied to other dual power unit installations. The principal purposes of the invention are to provide a support for two power units which accommodates relative axial expansion and radial expansion of the units and which is light and structurally simple.

The nature of the invention and the advantages thereof will be more fully apparent from the succeeding detailed description of the preferred embodiment of the invention and the accompanying drawings in which:

Figure 1 is a plan view of an aircraft power plant incorporating the invention;

Figure 2 is an elevation view of the same with parts cut away;

Figure 3 is a transverse sectional view of the same taken on the plane indicated by the line 3—3 in Figure 2;

Figure 4 is an enlarged sectional view of a detail taken on the plane indicated by the line 4—4 in Figure 3;

Figure 5 is an enlarged sectional view of a detail taken on the plane indicated by the line 5—5 in Figure 4.

Referring first to Figures 1 and 2, the general nature of the installation will be described. The power plant comprises a reduction gear assembly A and two engines or power units B. These units are mounted side by side with their axes parallel. Each comprises a forward frame 11, a compressor housed in a casing 12, a midframe 13, and a combustion section 14, only the forward portion of which is shown. The combustion section discharges into a turbine (not shown) which drives the compressor. The combustion section and turbine are supported from the midframe.

The reduction gear assembly comprises a casing 16 within which is gearing coupling the power units to a propeller shaft or shafts illustrated as dual counter-rotating shafts 17 and 18. The details of the power units and of the reduction gear are immaterial to the invention.

Referring to Figure 2, the power output from each engine is transmitted to the reduction gear by an extension shaft 19 splined to the forward end of the compressor shaft 20 and to a shaft 21 in the reduction gear. Each extension shaft is enclosed in a housing 22 rigidly bolted to the forward frame 11 and the reduction gear case 16. The forward frames are interconnected by two rigid brackets 24, one above and one below the centerline of the engines, these brackets being bolted to pads on the midframes. An additional bracket 26 is bolted to the upper outer mounting pad on each forward frame. These brackets are connected by struts 27 to clevised bolts 28 fixed on the reduction gear case. A shock absorbing mounting structure 31 is provided at each side of the reduction gear case by which it is supported from fixed structure of the aircraft indicated at 32. The structure thus far described provides a rigid assembly of the reduction gear and the two power units and supports the forward end of the power plant at the reduction gear. All of this structure is the same as that of the McDowall patent referred to above, wherein it is described in further detail.

The third support for the power plant is located adjacent the center of gravity of the power units at the midframes 13. A support at this point is shown in the McDowall patent, but the present invention is directed to an improved support.

Referring now also to Figures 3 to 5, the rear supporting structure for the engines comprises an upper plate 36 and a lower plate 37, these plates extending from one power unit to the other and having arcuate ends fixed to the engines by bolts 38 which bolt the forward flange 39 of the midframe to the rear flange of the compressor case 12. These are thus rigidly fixed to the power units and resist any deflection in the plane of the plates. However, they are sufficiently flexible to yield readily to differential axial expansion of the compressor case such as may occur when only one power unit is operating. Each of the plates is connected for support to a vertical channel section supporting member 41 or 42. These parallel channels extend approximately from the lower edge of the lower plate to just above the top of the upper plate with the webs of the channels in contact with the plates.

Referring to Figure 4, the plate 36 is connected to channel 41 by a bolt 43 and nut 44. The bolt fits closely in an opening 46 in channel 41 and a hole 47 in plate 36. A washer 48 is provided between the head of the bolt and the web of channel 41. A flanged washer 51 engaging the plate 36 is slidable in an elongated slot 52 in the channel 42. The flange of the washer is adjacent to the outer face of channel 42 with clearance. As will be apparent, channel 41 is thus coupled to plate 36 to support it and channel 42 may slide vertically with respect to the plate.

The connection between the supporting channels and the lower plate 37 is identical to that just described, except for reversal of the connection such that channel 42 is fixed to and supports plate 37 while channel 41 is guided for sliding movement relative to the plate. For this reason, the connection is not described at length, it being sufficient to point out that the parts in Figure 5 corresponding to those of Figure 4 bear corresponding numbers.

The upper ends of the supporting channels 41 and 42 are suspended with freedom for relative vertical movement by two short rocker arms 61 pivoted to the upper ends of the channels by bolts 62 passing through holes in the flanges of the channels. The rocker arms are rockably supported by hanger or strap 63 (Figure 2) which is pivotably connected by bolt 64 to bracket 66 fixed to the supporting structure in the aircraft and by bolt or pin 67 to the rocker arm. Pin 67 passes through a hole 68 in each rocker arm. If distortions of the aircraft structure or temperature changes in the engine cause relative movement axially of the power units with respect to support 66, the hanger 63 can swing to accommodate such movement. Radial growth of the power units causes changes in the vertical separation of plates 36 and 37 which is accommodated by relative vertical movement of channels 41 and 42 accommodated by swinging of rocker arms 61. As previously stated, differential axial expansion of the compressors is accommodated by slight bending of plates 36 and 37.

It will be apparent from the foregoing that the structure according to the invention is strong and light in weight, that it is well adapted to provide all needed flexibility in the power plant support, and that it will minimize midframe distortion by a more even load distribution around the mid frames.

The detailed description of the preferred embodiment of the invention for the purposes of explaining the principles thereof is not to be construed as limiting or restricting the invention, since changes may be made by the exercise of skill in the art without departing from the principles of the invention.

I claim:

1. A power plant comprising, in combination, two gas turbine power units disposed side-by-side, the units having their axes generally parallel, rigid connecting means fixed to and connecting the power units adjacent one end of the units, means for supporting the said end of the units, plates fixed to and connecting the power units at a region spaced axially of the units from the rigid connecting means, the plates being flexible in the direction axially of the units to accommodate relative axial expansion of the units, one plate being located at each side of the plane containing the said axes, two members connected respectively to the plates and extending transversely to the said plane, and means for supporting the members with freedom for movement axially of the units and freedom for relative movement radially of the units.

2. A power plant comprising, in combination, two gas turbine power units disposed side-by-side, the units having their axes generally parallel, rigid connecting means fixed to and connecting the power units adjacent one end of the units, means for supporting the said end of the units, plates fixed to and connecting the power units at a region spaced axially of the units from the rigid connecting means, the plates being flexible in the direction axially of the units to accommodate relative axial expansion of the units, one plate being located at each side of the plane containing the said axes, two rigid members connected to and supporting the plates and extending transversely to the said plane, one member being fixed to one plate and the other member being fixed to the other plate, a support for the members, and means connecting the members to the support adapted to divide the load between the members.

3. A power plant comprising, in combination, two gas turbine power units disposed side-by-side, the units having their axes generally parallel, rigid connecting means fixed to and connecting the power units adjacent one end of the units, means for supporting the said end of the units, plates fixed to and connecting the power units at a region spaced axially of the units from the rigid connecting means, the plates being flexible in the direction axially of the units to accommodate relative axial expansion of the units, one plate being located at each side of the plane containing the said axes, two rigid members connected to the plates and extending transversely to the said plane, one member being fixed to one plate and having a slip connection to the other plate, the other member being fixed to the said other plate and having a slip connection to the said one plate, a rocker arm connected to both rigid members, and means for rockably supporting the rocker arm with freedom for movement axially of the units.

4. A power plant comprising, in combination, two gas turbine power units disposed side-by-side, the units having their axes generally parallel, plates fixed to and connecting the power units, the plates being flexible in the direction axially of the units to accommodate relative axial expansion of the units, one plate being located at each side of the plane containing the said axes, two rigid members connected to the plates and extending transversely to the said plane, one member being fixed to one plate and having a slip connection to the other plate, the other member being fixed to the said other plate and having a slip connection to the said one plate, a support for the rigid members, means connecting the rigid members to the support providing for relative movement of the rigid member radially of the units, and additional means connecting the rigid members to the support providing for concurrent movement of the rigid members axially of the units.

5. A support structure for two generally parallel power units characterized by radial and axial expansion in operation, the support comprising, in combination, two plates flexible in the direction axially of the units and rigid transversely to the said direction, the plates being adapted to be connected rigidly to the power units with the plates substantially in the same plane and spaced from each other, two suspension means connected respectively to the two plates, means supporting the two suspension means providing for relative movement of the suspension means radially of the engine, and additional means supporting the suspension means with freedom for movement thereof axially of the engine.

6. A support structure for two generally parallel power units characterized by radial and axial expansion in operation, the support comprising, in combination, two plates flexible in the direction axially of the units and rigid transversely to the said direction, the plates being adapted to be connected rigidly to the power units with the plates substantially in the same plane and spaced from each other, two suspension means connected respectively to the two plates, means connecting the two suspension means providing for relative movement of the suspension means radially of the engine, and means supporting the connecting means.

7. A support structure for two generally parallel power units characterized by radial and axial expansion in operation, the support comprising, in combination, two plates flexible in the direction axially of the units and rigid transversely to the said direction, the plates being adapted to be connected rigidly to the power units with the plates substantially in the same plane and spaced from each other, two suspension means connected respectively to the two plates, means connecting the two suspension means providing for relative movement of the suspension means radially of the engine, and means supporting the connecting means with freedom for movement thereof axially of the engine.

No references cited.